US012067152B2

(12) United States Patent
Ito et al.

(10) Patent No.: US 12,067,152 B2
(45) Date of Patent: Aug. 20, 2024

(54) VERIFICATION DEVICE, VERIFICATION SYSTEM, VERIFICATION METHOD, AND VERIFICATION PROGRAM

(71) Applicant: NIPPON TELEGRAPH AND TELEPHONE CORPORATION, Tokyo (JP)

(72) Inventors: Manami Ito, Musashino (JP); Kimihiro Yamakoshi, Musashino (JP); Hiroyoshi Takiguchi, Musashino (JP); Takeshi Nakatsuru, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 383 days.

(21) Appl. No.: 17/638,859

(22) PCT Filed: Sep. 3, 2019

(86) PCT No.: PCT/JP2019/034662
§ 371 (c)(1),
(2) Date: Feb. 28, 2022

(87) PCT Pub. No.: WO2021/044529
PCT Pub. Date: Mar. 11, 2021

(65) Prior Publication Data
US 2022/0292225 A1    Sep. 15, 2022

(51) Int. Cl.
*G06F 21/64* (2013.01)
*G06F 21/60* (2013.01)
*G06F 21/78* (2013.01)

(52) U.S. Cl.
CPC ............ *G06F 21/64* (2013.01); *G06F 21/602* (2013.01); *G06F 21/606* (2013.01); *G06F 21/78* (2013.01); *G06F 2221/2103* (2013.01)

(58) Field of Classification Search
CPC ...... G06F 21/64; G06F 21/602; G06F 21/606; G06F 21/78; G06F 2221/2103; G06F 21/57; H04L 9/3236; H04L 9/3271
See application file for complete search history.

(56) References Cited

U.S. PATENT DOCUMENTS 9,558,297 B1 * 1/2017 Bailey .................. G06F 12/023
11,212,103 B1 * 12/2021 Mukherjee ............ H04L 9/3242
(Continued)

OTHER PUBLICATIONS

Seshadri et al., "SWATT: SoftWare-based ATTestation for Embedded Devices", IEEE Symposium on Security and Privacy, 2004 Proceedings, pp. 272-282.
(Continued)

*Primary Examiner* — Carl G Colin
*Assistant Examiner* — Hany S. Gadalla
(74) *Attorney, Agent, or Firm* — XSENSUS LLP (57) ABSTRACT

A storage unit stores a size of a free area of storage of target equipment, and software saved in the storage. The generation unit generates a graph including a number of nodes according to the size of the free area of the storage, and transmits the graph to the target equipment. The calculation unit calculates a hash value corresponding to each software block saved in the storage. The verification unit verifies the presence or absence of tampering of the storage of the target equipment using the hash value corresponding to the block calculated, a response calculated using the graph returned to a challenge that specifies a node of the graph, and a hash value corresponding to the block returned as the response to the challenge that specifies the block.

8 Claims, 5 Drawing Sheets

(56) References Cited

U.S. PATENT DOCUMENTS

2007/0198838 A1* 8/2007 Nonaka ................ H04L 9/3247
713/176
2008/0184041 A1* 7/2008 Jakubowski ............ G06F 21/14
726/22

OTHER PUBLICATIONS

Ren et al., "Proof of Space from Stacked Expanders", Theory of Cryptography Conference, 2016, pp. 262-285.
Dziembowski et al., "Proofs of Space", Annual Cryptology Conference, 2015, pp. 585-605.

* cited by examiner

VERIFICATION DEVICE, VERIFICATION SYSTEM, VERIFICATION METHOD, AND VERIFICATION PROGRAM

CROSS-REFERENCE TO RELATED APPLICATION

The present application is based on PCT filing PCT/JP2019/034662, filed Sep. 3, 2019, the entire contents of which are incorporated herein by reference.

TECHNICAL FIELD

The present invention relates to a verification device, a verification system, a verification method, and a verification program.

BACKGROUND ART

In recent years, due to the spread of IoT (Internet of Things), it becomes important to detect malware and software tampering in embedded equipment and to take security measures. On the other hand, in an embedded system, from the viewpoint of cost and the like, it is difficult to incorporate hardware having tamper resistance, and it is difficult to expand the function as compared with a general-purpose PC such as a server. Therefore, a whitelist-type detection technology is expected to verify externally whether software installed in equipment deviates from a predefined correct state without using special hardware (Non-Patent Literature 1).

CITATION LIST

Non-Patent Literature

Non-Patent Literature 1: A. Seshadri, A. Perrig, L. van Doorn, P. Khosla, "SWATT: SoftWare-based ATTestation for Embedded Devices", USA, IEEE Symposium on Security and Privacy, 2004. Proceedings, 2004, pp. 272-282

Non-Patent Literature 2: Ling Ren, Srinivas Devadas, "Proof of Space from Stacked Expanders", Theory of Cryptography Conference, Germany, 2016, p. 262-285

Non-Patent Literature 3: Stefan Dziembowski, Sebastian Faust, Vladimir Kolmogorov, Krzysztof Pietrzak, "Proofs of Space", Annual Cryptology Conference, Germany, 2015, pp. 585-605

SUMMARY OF THE INVENTION

Technical Problem

However, in the conventional technology, it may be difficult to verify the presence or absence of tampering of software of embedded equipment from the outside of the equipment. For example, according to the technology described in Non-Patent Literature 1, although it can be proved that the software area of the storage of the equipment is not tampered with, it is difficult to prove that no unauthorized software is added to the free area.

The present invention has been made in view of the above, and an object of the present invention is to verify the presence or absence of tampering of software of embedded equipment from the outside of the equipment.

Means for Solving the Problem

In order to solve the above-mentioned problems and achieve the object, a verification device according to the present invention is characterized by including: a storage unit that stores a size of a free area of storage of target equipment, and software saved in the storage; a generation unit that generates a graph including a number of nodes according to the size of the free area of the storage of the target equipment, and transmits the graph to the target equipment; a calculation unit that calculates a hash value corresponding to each software block saved in the storage of the target equipment; and a verification unit that verifies the presence or absence of tampering of the storage of the target equipment using the hash value corresponding to the block calculated, a response calculated using the graph returned from the target equipment to a challenge that specifies a node of the graph, and a hash value corresponding to the block returned from the target equipment as the response to the challenge that specifies the block.

Effects of the Invention

According to the present invention, it is possible to easily verify the presence or absence of tampering of software of embedded equipment from the outside of the equipment.

DESCRIPTION OF EMBODIMENTS

Hereinafter, an embodiment of the present invention will be described in detail with reference to the drawings. It is noted that the present invention is not limited by the embodiment. Further, in the description of the drawings, the same portions are designated by the same reference numerals.

[Configuration of Verification System]

Figure 1:
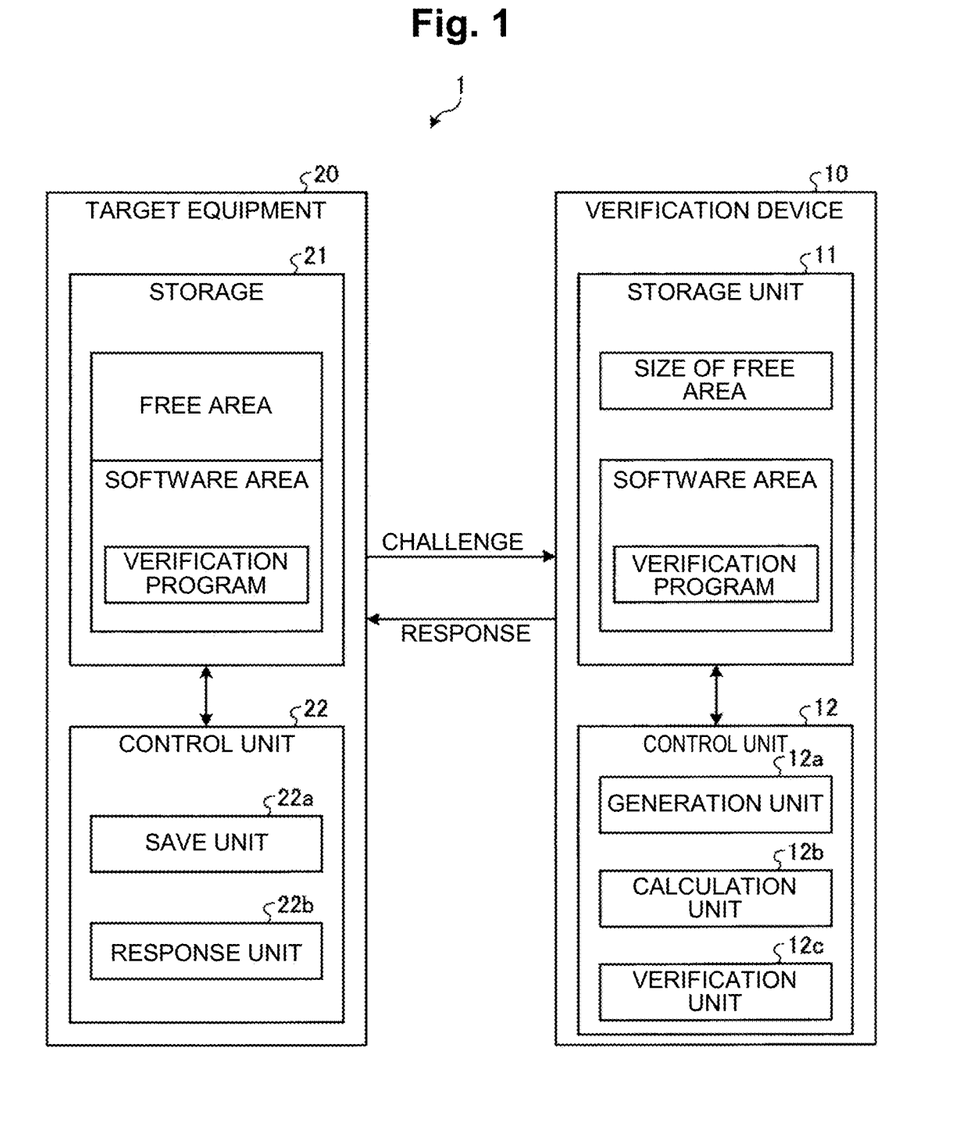
FIG. 1 is a schematic diagram illustrating a schematic configuration of a verification system according to the present embodiment.

FIG. 1 is a schematic diagram illustrating a schematic configuration of a verification system of the present embodiment. As shown in FIG. 1, a verification system 1 includes a verification device 10 and target equipment 20. The target equipment 20 is software-embedded equipment such as IoT equipment that is a target of verification processing described later. Here, in the present embodiment, programs and data are collectively referred to as software. Further, in storage 21 of the target equipment 20, an area in which software is saved is referred to as a software area.

The verification device 10 verifies, through verification processing described later, whether the software area of the target equipment 20 is not tampered with and unauthorized software is not added to the free area. Thus, the verification device 10 can verify whether the program and data of the target equipment 20 are not tampered with or the unauthorized program and data are not added, that is, verify the presence or absence of tampering of the software of the target equipment 20, from the outside of the target equipment 20.

[Configuration of Verification Device]

FIG. 1 is a schematic diagram illustrating a schematic configuration of a verification device according to the present embodiment. As illustrated in FIG. 1, the verification device 10 of the present embodiment is realized by a general-purpose computer such as a personal computer, and includes a storage unit 11, a control unit 12, and a communication control unit not shown.

The storage unit 11 is realized by a semiconductor memory element such as RAM (Random Access Memory) or a flush memory, or a storage device such as a hard disk or an optical disk. In the storage unit 11, a processing program for operating the verification device 10, data used during execution of the processing program and the like are stored in advance, or are temporarily stored each time processing is performed. In the present embodiment, the storage unit 11 stores the size of the free area of the storage 21 of the target equipment 20, and the software saved in the storage 21.

The software includes a verification program which is a program for operating the target equipment 20 as a target of verification processing described later. Further, the software area is divided into arbitrary blocks by addresses and the like. It is assumed that data d(x) is saved in the block x.

The communication control unit is realized by an NIC (Network Interface Card) or the like, and controls communication between an external device such as the target equipment 20 and the control unit 12 via a telecommunication line such as a LAN (Local Area Network), the Internet or the like.

The control unit 12 is realized by using a CPU (Central Processing Unit) or the like, and executes a processing program stored in the memory. Thus, the control unit 12 functions as a generation unit 12a, a calculation unit 12b, and a verification unit 12c, as illustrated in FIG. 1. It is noted that each of or part of these functional units may be implemented in different hardware. Further, the control unit 12 may include other functional units.

The generation unit 12a generates a graph including a number of nodes according to the size of the free area of the storage 21 of the target equipment 20, and transmits the graph to the target equipment 20.

First, graph labeling for the directed acyclic graph G=(V, E) will be described. Here, V is a set of nodes included in G, and E is a set of edges. The number of nodes included in V is labeled as |V|=N, and each node is labeled with a numerical value of 1 to N. In addition, the numerical value $\omega(v) \in \{1, 0\}^{\lambda}$ is associated with every node $v \in V$. $\lambda$ is the size of the hash value.

Here, for the subset $V'=\{v_1, \ldots, v_n\}$, $v_i \subset V$, $\omega(V')=\{\omega(v_1), \ldots, \omega(v_n)\}$ is defined. Further, the set of parent nodes of v is defined as $\pi(v)=\{v'|(v', v) \in E\}$. Moreover, the numerical value $\omega(v)=H(v, \omega(v, \pi(v)))$ corresponding to each node is defined. Here, H is the hash function $H:\{1,0\}^* \to \{1,0\}^{\lambda}$.

In the present embodiment, the Localized Stacked Expanders $LG_{(n, k, \alpha, \beta)}$ proposed in Non-Patent Literature 2 is used as a directed acyclic graph. The Localized Stacked Expanders is a graph of the number of nodes n(k+1) including k+1 Localized Bipartite Expanders $LBG_{(n, \alpha, \beta)}$ of the directed bipartite graph with n nodes.

It is known that the Localized Stacked Expanders can be used to construct graphs that require a certain amount of memory capacity or more in order to calculate ω(v) at all nodes v.

Figure 2:
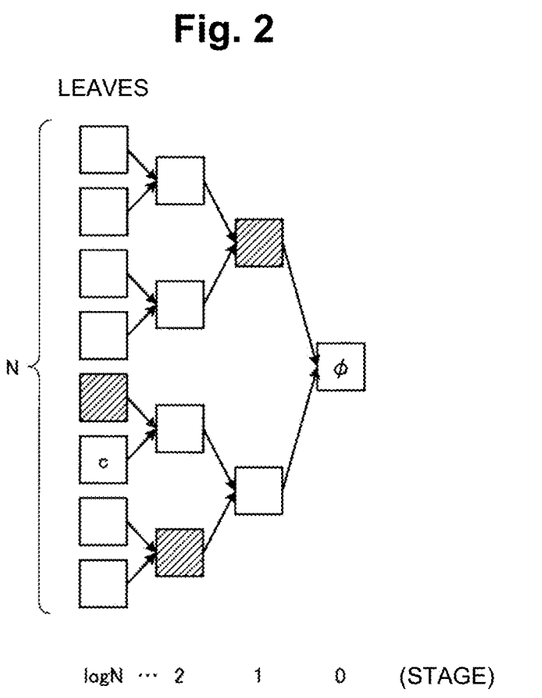
FIG. 2 is a diagram for explaining the processing of a generation unit.

Next, a verification method using a hash tree proposed in Non-Patent Literature 1 will be described with reference to FIG. 2. FIG. 2 is a diagram for explaining the processing of the generation unit 12a. As shown in FIG. 2, generating a hash tree with N leaves results in a hash tree with (log N+1) stages. Assuming that the terminal node φ having no output edge is the $0^{th}$ stage, the left end of FIG. 2 is the log $N^{th}$ stage. The hash value corresponding to each node is a concatenated hash value with the hash value of the parent node.

Here, the function Open(c) is a function as follows. That is, it is assumed that the set of nodes reachable to the node v is n(v), and the set of nodes having input edges from the node v is σ(v)=v'(v, v')∈E. Open(c) is a function that satisfies the following equation (1) for i=1, ..., log N when the node c of the log $N^{th}$ stage is selected.

[Math. 1]

$$\text{For Open } (c): i=1, \ldots, \log N, \text{ the function that returns all } v \text{ satisfying } v \notin \Pi(c) \text{ and } \sigma(v) \in \Pi(c) \quad (1)$$

In other words, this Open(c) is a function that returns the hash value of a node shaded in FIG. 2, which is required to calculate the hash value of the node that is not reachable to c but is reachable to a child node of c, that is, a node φ at the end of the graph.

In the processing described later, when the verification device 10 sends, for the node c, the challenge C(c∈C) to the target equipment 20, the target equipment 20 returns Open (c) and π(c) as a response to the challenge C. In this case, for all c∈C, if the hash value H((π(c)) of the parent node matches the hash value of c and H(Open(c)) matches, it can be guaranteed with a high probability that the target equipment 20 correctly calculates ω(v) corresponding to the N nodes v.

Figure 3:
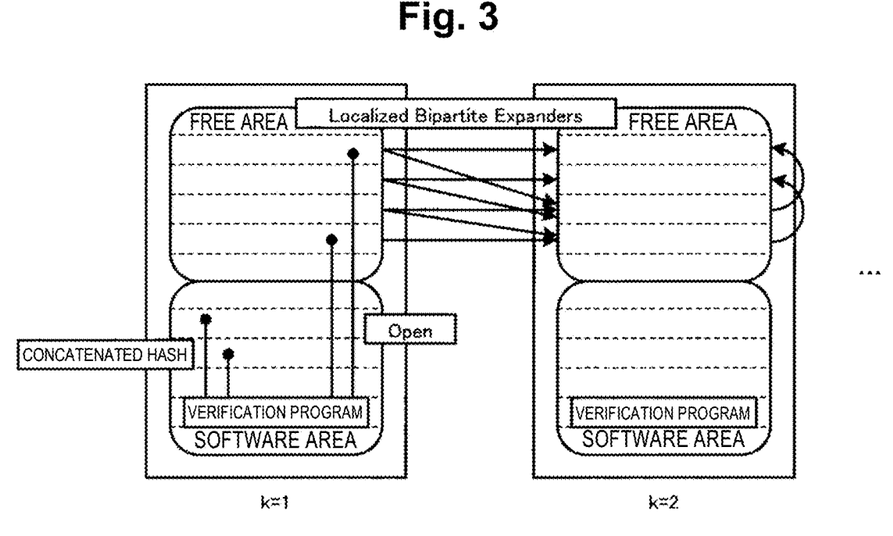
FIG. 3 is a diagram for explaining an overview of verification processing.

Then, the generation unit 12a generates and transmits the Localized Bipartite Expander $LBG_{(n, \alpha, \beta)}$ with the number n of nodes to the target equipment 20. Here, FIG. 3 is a diagram for explaining an overview of the verification processing. As shown in FIG. 3, the verification device 10 of the present embodiment expands the $LGB_{(n, \alpha, \beta)}$ in the space of the size n in the free area of the storage 21 of the target equipment 20 by the verification program. Then, the verification device 10 uses the Open function corresponding to the nodes of the graph to prove that the free area in the storage 21 of the target equipment 20 is definitely free.

In addition, in the process of calculating the hash value of the $LBG_{(n, \alpha, \beta)}$, the verification device 10 randomly specifies the block x of the software area, and verifies whether the software area of the storage 21 of the target equipment 20 is not tampered with using the concatenated hash value calculated by referring to the data d(x) of the block x.

Specifically, the generation unit 12a first generates and transmits the Localized Bipartite Expander $LBG_{(n, \alpha, \beta)}$ with the number n of nodes to the target equipment 20.

As will be described later, in the target equipment 20, a space of size n in the free area in the storage 21 is reserved for the verification processing, and the hash value is written based on the received $LBG_{(n, \alpha, \beta)}$.

Return to the description of FIG. 1. The calculation unit 12b calculates a hash value corresponding to each software block saved in the storage 21 of the target equipment 20. Specifically, the calculation unit 12b calculates values such as H (Open($c_1$)), z($c_2$)) and the like used for each of k times of the processing to be repeated by the verification unit 12c, which will be described later.

In addition, the verification unit 12c verifies the presence or absence of tampering of the storage 21 of the target equipment 20 using the hash value corresponding to the block calculated, a response calculated using the graph returned from the target equipment 20 to the challenge that specifies a node of the graph, and a hash value corresponding to the block returned from the target equipment 20 as the response to the challenge that specifies the block.

The verification unit 12c verifies that the response calculated using the graph returned from the target equipment 20 has consistency with all the challenges, and whether the hash value corresponding to the block calculated matches the hash value corresponding to the block returned from the target equipment 20.

The verification unit 12c further uses a concatenated hash value using a predetermined number of random numbers as the hash value corresponding to the block.

Specifically, the verification unit 12c transmits the challenge $C=\{C_1, c_2, L\}$ to the target equipment 20. Here, $C_1$ is a challenge to a free area of the storage 21, and specifies a node $c_1 \in C_1$ of the generated graph. Further, $c_2$ is a challenge to the software area of the storage 21, and randomly specifies blocks. Moreover, L is the number of random numbers to be generated when randomly specifying blocks, i.e., the information that specifies the number of blocks to be specified.

The verification unit 12c receives $Open(c_1)$ and $\pi(c_1)$ from the target equipment 20 as a response to the challenge $c_1$ for all $c_1 \in C_1$.

In addition, the verification unit 12c receives the concatenated hash value $z(c_2)=H(d(r_1), \ldots, d(r_L))$ from the target equipment 20 as a response to the challenge $c_2$. Here, $R(c_2)=\{r_1, \ldots, r_L\}$ is a random number sequence of L random numbers generated by the pseudo-random number generation function.

That is, the verification unit 12c receives $\{Open(c_1), \pi(c_1), z(c_2)\}$ as a response to the challenge C.

Then, the verification unit 12c verifies, for all $c \in C$, whether $H((n(c)))$ matches the hash value of c, whether $H(Open(c))$ all match, and whether the concatenated hash value $z(c_2)$ matches the value calculated by the calculation unit 12b. When all of them match, the verification unit 12c guarantees with a high probability that the free area is reliably free and the software area is not tampered with, that is, the storage 21 of the target equipment 20 is not tampered with.

The verification unit 12c repeats the above processing k times. As described above, the verification device 10 performs the verification processing using the graph of the number of nodes n(k+1).

It is noted that the generation unit 12a generates a graph such that a product of the number of nodes and the size of the hash value corresponding to each node approximates the size of the free area of the storage 21 of the target equipment 20 within a predetermined range.

For example, if $\gamma=\beta-2\alpha$ is sufficiently close to 1, it is possible to prove that the area having a capacity $\gamma n$ sufficiently close to the free area is used, and thus it is possible to prove that unauthorized software is not added to the free area. However, it is known that the number d of input edges for each node increases exponentially as $\gamma$ is brought closer to 1. The size of the area that can be proved by the verification device 10 is a trade-off with the calculation amount dnk of LBG, and may be, for example, $0.7<\gamma<0.9$.

[Target Equipment]

The target equipment 20 includes the storage 21, the control unit 22, and a communication control unit not shown.

The storage 21 is realized by a semiconductor memory element such as a RAM (Random Access Memory) or a flush memory, or a storage device such as a hard disk or an optical disk. In the storage 21, a processing program for operating the target equipment 20, data used during execution of the processing program and the like are stored in advance, or are temporarily stored each time processing is performed. In the present embodiment, a verification program, which is a program for operating as the target equipment 20, is stored in the software area of the storage 21.

The communication control unit is realized by an NIC (Network Interface Card) or the like, and controls communication between an external device such as the verification device 10 and the control unit 22 via a telecommunication line such as a LAN (Local Area Network) or the Internet.

The control unit 22 is realized by using a CPU (Central Processing Unit), an NP (Network Processor), an FPGA (Field Programmable Gate Array) or the like, and executes a processing program stored in a memory. In the present embodiment, the control unit 22 functions as the save unit 22a and the response unit 22b by executing the verification program.

The save unit 22a saves the hash value calculated corresponding to each node of the graph received from the verification device 10 in the free area of the storage 21. Specifically, when the save unit 22a receives the Localized Bipartite Expanders $LBG_{(n, \alpha, \beta)}$ having the number n of nodes, a space of size n in the free area in the storage 21 is reserved for the verification processing, and the hash value is written based on the received $LBG_{(n, \alpha, \beta)}$.

When the response unit 22b receives the challenge specifying the node of the graph and the block of the software saved in the storage from the verification device 10, the response unit 22b responds to the verification device 10 with a response calculated using the hash value corresponding to the saved node and a hash value calculated corresponding to the block.

Further, when the response unit 22b receives the challenge specifying the block from the verification device 10, if the number of random numbers is further specified, the response unit 22b returns a concatenated hash value calculated using the further specified number of the random numbers as the hash value corresponding to the block.

Specifically, when the challenge $C=\{C_1, c_2, L\}$ is received from the verification device 10, the response unit 22b calculates $Open(c_1)$ and $\pi(c_1)$ for all $c_1 \in C_1$.

In addition, the random number sequence $R(c_2)=\{r_1, \ldots, r_L\}$ is generated using the challenge c2 as the seeds of the pseudo-random number generation function. Then, the response unit 22b calculates the concatenated hash value $z(c_2)=H(d(r_1), \ldots, d(r_L))$.

Then, the response unit 22b returns res=$\{Open(c_1), \pi(c_1), z(c_2)\}$ to the verification device 10 as a response to the challenge. The target equipment 20 repeats the above processing k times with the verification device 10. Thus, as described above, the verification device 10 verifies the presence or absence of tampering of the storage 21 of the target equipment 20.

[Verification Processing]

Figure 4:
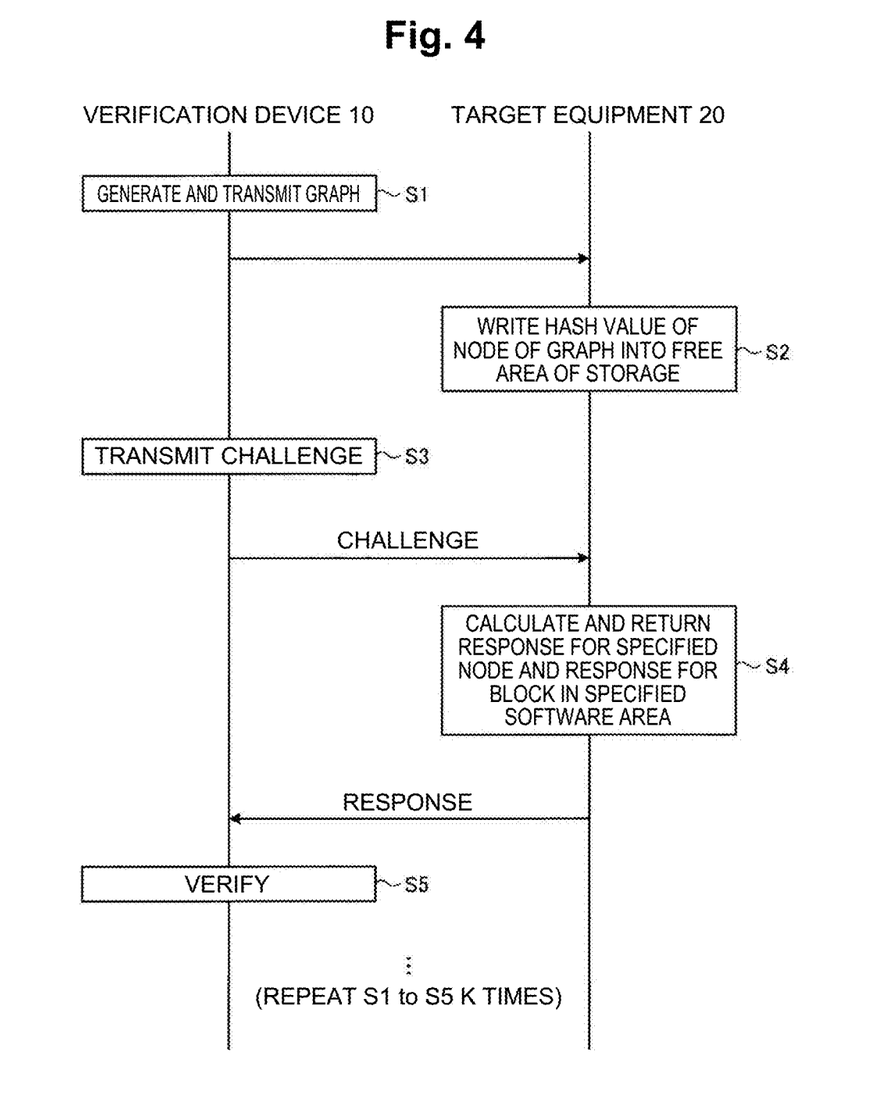
FIG. 4 is a sequence diagram showing a verification processing procedure.

Next, the verification processing by the verification device 10 according to the present embodiment will be described with reference to FIG. 4. FIG. 4 is a sequence diagram showing a verification processing procedure. The sequence of FIG. 4 starts, for example, at the timing when a user makes an operational input indicating the start.

First, in the verification device 10, the generation unit 12a generates a graph including a number of nodes according to the size of the free area of the storage 21 of the target equipment 20, and transmits the graph to the target equipment 20 (step S1).

In the target equipment 20, the save unit 22a calculates a hash value corresponding to each node of the graph received from the verification device 10, and saves the hash value in the free area of the storage 21 (step S2).

Next, in the verification device 10, the verification unit 12c transmits a challenge specifying the node of the graph and the block of the software saved in the storage to the target equipment 20 (step S3).

In the target equipment 20 that receives the challenge, the response unit 22b calculates a response to the challenge specifying the node using the graph, and calculates a hash value corresponding to the block as a response to the challenge specifying the block. Further, the response unit 22b returns the calculated response to the verification device 10 (step S4).

In the verification device 10 that receives the response, the verification unit 12c verifies the presence or absence of tampering of the storage 21 of the target equipment 20 (step S5). Specifically, the verification unit 12c verifies whether the response to the challenge specifying the node matches all the challenges. In addition, the verification unit 12c verifies whether the response to the challenge specifying the block matches the hash value corresponding to the block calculated by the calculation unit 12b. The verification unit 12c repeats the processing of steps S1 to S5 k times.

For example, when all of them match, the verification unit 12c determines that the free area of the storage 21 of the target equipment 20 is reliably free and the software area is not tampered with, that is, that the storage 21 of the target equipment 20 is not tampered with.

Further, the verification unit 12c displays and outputs the verification result to an output unit not shown such as a display. Thus, a series of verification processing is completed.

As described above, in the verification device 10 of the present embodiment, the storage unit 11 stores the size of the free area of the storage of the target equipment, and the software saved in the storage. Further, the generation unit 12a generates a graph including a number of nodes according to the size of the free area of the storage 21 of the target equipment 20, and transmits the graph to the target equipment 20. In addition, the calculation unit 12b calculates a hash value corresponding to each software block saved in the storage 21 of the target equipment 20. In addition, the verification unit 12c verifies the presence or absence of tampering of the storage 21 of the target equipment 20 using the hash value corresponding to the block, a response calculated using the graph returned from the target equipment 20 to the challenge that specifies the node of the graph, and a hash value corresponding to the block returned from the target equipment 20 as the response to the challenge that specifies the block.

The verification unit 12c verifies that the response calculated using the graph returned from the target equipment 20 has consistency with all the challenges, and whether the hash value corresponding to the block calculated matches the hash value corresponding to the block returned from the target equipment 20.

Thus, the verification device 10 can prove with high accuracy that the free area is reliably free by making use of an area having a predetermined capacity or more among the free area of the storage 21 including the volatile memory of the target equipment 20. In addition, the verification device 10 can detect the presence or absence of tampering of the software area by referring to the data in the software area. In particular, the verification device 10 can detect with a high probability when either or both of the tampering of the software area of the storage 21 or the addition of unauthorized software to the free area occurs. Therefore, the verification device 10 can simultaneously verify the presence or absence of tampering of the software area or whether the free area is reliably free. As described above, according to the verification device 10, it is possible to verify the presence or absence of tampering of the software of the embedded equipment 20 from the outside of the target equipment 20.

In addition, the generation unit 12a generates a graph such that the product of the number of nodes and the size of the hash value corresponding to each node approximates the size of the free area of the storage of the target equipment 20 within a predetermined range. Thus, the verification device 10 can verify whether the free area of the target equipment 20 is reliably free with even higher accuracy.

Further, in the target equipment 20, the save unit 22a saves the hash value calculated corresponding to each node of the graph received from the verification device 10 in the free area of the storage 21. Further, when the response unit 22b receives the challenge specifying the node of the graph and the block of the software saved in the storage from the verification device 10, the response unit 22b responds to the verification device 10 with a response calculated using a hash value corresponding to the node of the saved graph and a hash value calculated corresponding to the block.

Thus, the verification device 10 can verify the presence or absence of tampering of the storage 21 of the target equipment 20.

In addition, the verification unit 12c of the verification device 10 further specifies the number of random numbers when the verification unit 12c transmits the challenge specifying the block to the target equipment 20. In this case, the response unit 22b of the target equipment 20 returns the concatenated hash value calculated using the further specified number of random numbers as the hash value corresponding to the block. This makes it possible to verify the presence or absence of tampering of the software area with even higher accuracy.

It is noted that the verification device 10 searches the software area kL times. At this time, the probability of detecting that εm in the software area of size m is tampered with is $(1-\varepsilon)^{kL}$. If $\varepsilon=(1/kL)$, this probability is $e^{-kL}$ when kL is sufficiently large. Therefore, if kL is sufficiently large, the probability of missing the tampering of the software area becomes low exponentially.

Further, in the above embodiment, the calculation amount of the target equipment 20 is $k(2n-1+L+dn)$, and the calculation amount of the verification device 10 is $k(|C_1|\log n+L)$. When kL is sufficiently large, the calculation amounts of the verification device 10 and the target equipment 20 are both kL.

[Program]

It is also possible to create a program in which the processing executed by the verification device 10 according to the above embodiment is described in a language that can be executed by a computer. As one embodiment, the verification device 10 can be implemented by installing a verification program for executing the above-described verification processing as package software or on-line software in a desired computer. For example, by causing the information processing device to execute the verification program, the information processing device can function as the verification device 10. The information processing device in this context includes a desktop or notebook personal computers. In addition, the information processing device includes a mobile communication terminal such as a smart phone, a mobile phone or a PHS (Personal Handyphone System), and a slate terminal such as a PDA (Personal Digital Assistant). Further, the function of the verification device 10 may be implemented in a cloud server.

Figure 5:
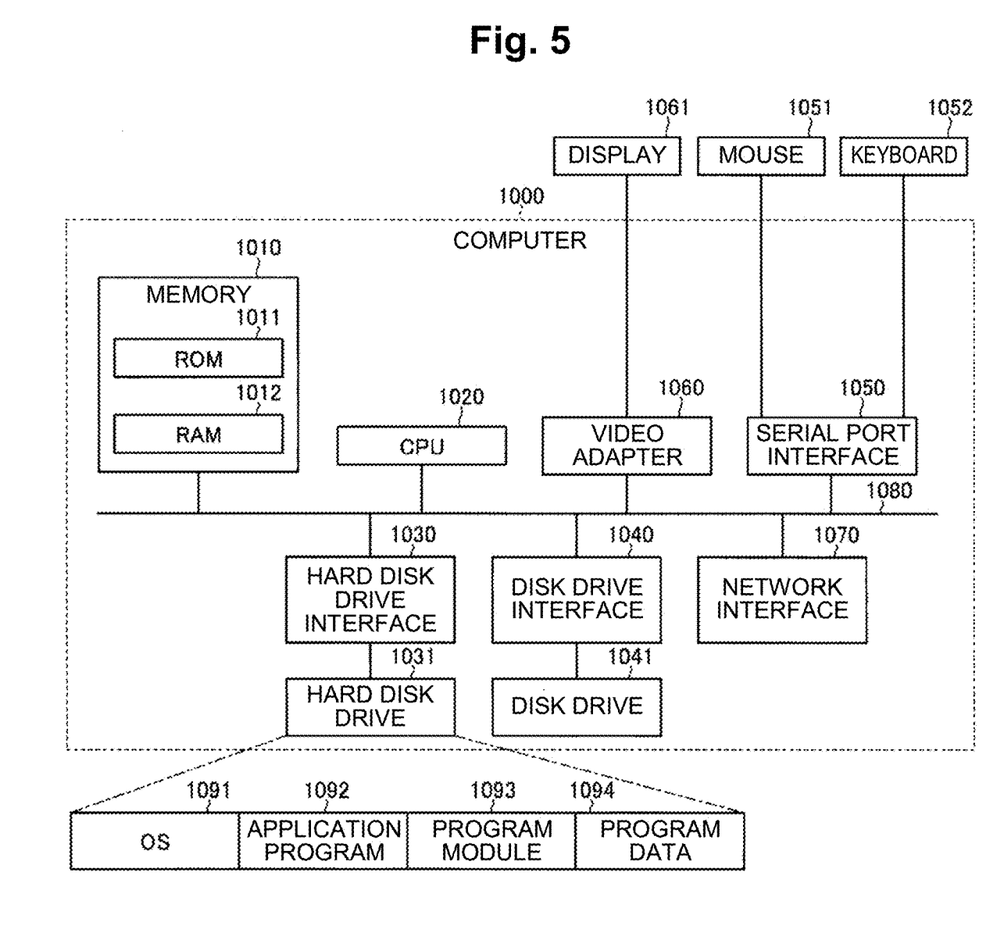
FIG. 5 is a diagram showing an example of a computer that executes a verification program.

FIG. 5 is a diagram showing an example of a computer that executes a verification program. The computer 1000 includes, for example, a memory 1010, a CPU 1020, a hard disk drive interface 1030, a disk drive interface 1040, a serial port interface 1050, a video adapter 1060, and a network interface 1070. These components are connected by a bus 1080.

The memory 1010 includes a ROM (Read Only Memory) 1011 and a RAM 1012. The ROM 1011 stores, for example, a boot program such as a BIOS (Basic Input Output System). The hard disk drive interface 1030 is connected to the hard disk drive 1031. The disk drive interface 1040 is connected to a disk drive 1041. A removable storage medium such as a magnetic disk or an optical disk is inserted into the disk drive 1041. For example, a mouse 1051 and a keyboard 1052 are connected to the serial port interface 1050. A display 1061, for example, is connected to the video adapter 1060.

Here, the hard disk drive 1031 stores, for example, an OS 1091, an application program 1092, a program module 1093, and program data 1094. Each piece of information described in the above embodiment is stored in, for example, the hard disk drive 1031 or the memory 1010.

Further, the verification program is stored in the hard disk drive 1031 as, for example, a program module 1093 in which instructions to be executed by the computer 1000 are described. Specifically, the program module 1093 describing each process executed by the verification device 10 described in the above embodiment is stored in the hard disk drive 1031.

Further, data used for information processing by the verification program is stored as program data 1094 in, for example, the hard disk drive 1031. Then, the CPU 1020 reads the program module 1093 and the program data 1094 stored in the hard disk drive 1031 into the RAM 1012 as necessary, and executes each of the procedures described above.

It is noted that the program module 1093 and the program data 1094 relating to the verification program are not limited to being stored in the hard disk drive 1031, and may be stored in a removable storage medium, for example, and read out by the CPU 1020 via the disk drive 1041 or the like. Alternatively, the program module 1093 and the program data 1094 relating to the verification program may be stored in another computer connected via a network such as LAN or WAN (Wide Area Network), and read out by the CPU 1020 via the network interface 1070.

The embodiment to which the invention made by the present inventor is applied have been described above, but the present invention is not limited by the description and drawings that form part of the disclosure of the present invention according to the present embodiment. That is, all other embodiments, examples, operational techniques and the like performed by a person skilled in the art based on the present embodiment are included in the scope of the present invention.

REFERENCE SIGNS LIST

1 Verification system
10 Verification device
11 Storage unit
12 Control unit
12a Generation unit
12b Calculation unit
12c Verification unit
20 Target equipment
21 Storage
22 Control unit
22a Save unit
22b Response unit

The invention claimed is:

1. A verification device characterized by comprising:
a memory; and
a processor coupled to the memory and programmed to execute a process comprising:
storing a size of a free area of storage of target equipment, and software saved in the storage;
generating a graph including a number of nodes according to the size of the free area of the storage of the target equipment, and transmitting the graph to the target equipment;
calculating a hash value corresponding to each software block saved in the storage of the target equipment; and
verifying presence or absence of tampering of the storage of the target equipment using a hash value corresponding to the software block calculated, a response calculated using the graph returned from the target equipment to a challenge that specifies a node of the graph, and a hash value corresponding to a software block returned from the target equipment as the response to a challenge that specifies the software block calculated.

2. The verification device according to claim 1, characterized in that the verifying verifies that the response calculated using the graph returned from the target equipment has consistency with all challenges, and whether the hash value corresponding to the software block calculated matches the hash value corresponding to the software block returned from the target equipment.

3. The verification device according to claim 1, characterized in that the generating generates the graph such that a product of the number of nodes and a size of the hash value corresponding to each node approximates the size of the free area of the storage of the target equipment within a predetermined range.

4. The verification device according to claim 1, characterized in that the verifying further uses a concatenated hash value using a predetermined number of random numbers as the hash value corresponding to the software block calculated.

5. A verification system including a verification device and target equipment, characterized in that:
the verification device comprises:
a memory; and
a processor coupled to the memory and programmed to execute a process comprising:
storing a size of a free area of storage of the target equipment, and software saved in the storage;
generating a graph including a number of nodes according to the size of the free area of the storage of the target equipment, and transmitting the graph to the target equipment;
calculating a hash value corresponding to each software block saved in the storage of the target equipment; and
verifying presence or absence of tampering of the storage of the target equipment using a hash value corresponding to the software block calculated, a response calculated using the graph returned from the target equipment to a challenge that specifies a node of the graph, and a hash value corresponding to the software block returned from the target equipment as the response to a challenge that specifies the software block calculated; and the target equipment comprises:

a memory; and a processor coupled to the memory and programmed to execute a process comprising:

saving a hash value calculated corresponding to each node of the graph received from the verification device in the free area of the storage; and responding, when the challenge specifying the node of the graph and the software block of the software saved in the storage is received from the verification device, to the verification device with a response calculated using a hash value corresponding to a node of the graph saved and a hash value calculated corresponding to the software block specified.

6. The verification system according to claim 5, characterized in that:

the verifying further specifies a number of random numbers when the verification device transmits the challenge specifying the software block to the target equipment, and the responding by the target equipment returns a concatenated hash value calculated using the further specified number of random numbers as a value corresponding to the block specified.

7. A verification method executed by a verification device, the verification device including a memory that stores a size of a free area of storage of target equipment, and software saved in the storage, the verification method characterized by comprising:

a generation step of generating a graph including a number of nodes according to the size of the free area of the storage of the target equipment, and transmitting the graph to the target equipment;

a calculating step of calculating a hash value corresponding to each software block saved in the storage of the target equipment; and a verifying step of verifying presence or absence of tampering of the storage of the target equipment using a hash value corresponding to the software block calculated, a response calculated using the graph returned from the target equipment to a challenge that specifies a node of the graph, and a hash value corresponding to a software block returned from the target equipment as the response to a challenge that specifies the software block calculated.

8. A non-transitory computer-readable recording medium having stored therein a verification program for causing a computer to execute:

by referring to a storage memory that stores a size of a free area of storage of target equipment, and software saved in the storage, a generating step of generating a graph including a number of nodes according to the size of the free area of the storage of the target equipment, and transmitting the graph to the target equipment;

a calculating step of calculating a hash value corresponding to each software block saved in the storage of the target equipment; and a verifying step of verifying presence or absence of tampering of the storage of the target equipment using a hash value corresponding to the software block calculated, a response calculated using the graph returned from the target equipment to a challenge that specifies a node of the graph, and a hash value corresponding to a software block returned from the target equipment as the response to a challenge that specifies the software block calculated.

* * * * *